United States Patent [19]
Soper et al.

[11] Patent Number: 6,050,456
[45] Date of Patent: *Apr. 18, 2000

[54] SCREW FEEDER FOR PROPORTIONING MACHINE

[75] Inventors: James L. Soper; Dan R. Free, both of Manitowoc, Wis.

[73] Assignee: Progressive Technology of Wisconsin, Inc., Manitowoc, Wis.

[*] Notice: This patent issued on a continued prosecution application filed under 37 CFR 1.53(d), and is subject to the twenty year patent term provisions of 35 U.S.C. 154(a)(2).

[21] Appl. No.: 08/964,004

[22] Filed: Nov. 4, 1997

[51] Int. Cl.⁷ ................................................ G01F 11/20
[52] U.S. Cl. ........................................ 222/272; 222/413
[58] Field of Search .......................... 222/271, 272, 222/413

[56] References Cited

U.S. PATENT DOCUMENTS

| | | | |
|---|---|---|---|
| 3,695,486 | 10/1972 | Warner | 222/162 |
| 3,799,405 | 3/1974 | Wallace | 222/271 X |
| 4,233,710 | 11/1980 | Wagner. | |
| 4,313,240 | 2/1982 | Righele et al. . | |
| 4,797,973 | 1/1989 | Righele et al. . | |
| 4,974,646 | 12/1990 | Martin et al. | 222/77 X |
| 5,018,648 | 5/1991 | Gmur | 222/272 |
| 5,330,113 | 7/1994 | Poser et al. | 241/74 |

*Primary Examiner*—Lesley D. Morris
*Assistant Examiner*—Sean P. O'Hanlon
*Attorney, Agent, or Firm*—Andrus, Sceales, Starke & Sawall

[57] ABSTRACT

A feed hopper for a bulk food proportioning machine includes a pair of horizontally disposed counterrotating feed screws in the bottom of the hopper which provide a uniform and continuous gentle flow of product to the hopper outlet which is positioned to feed directly downwardly into the fill inlet of the proportioning machine.

5 Claims, 2 Drawing Sheets

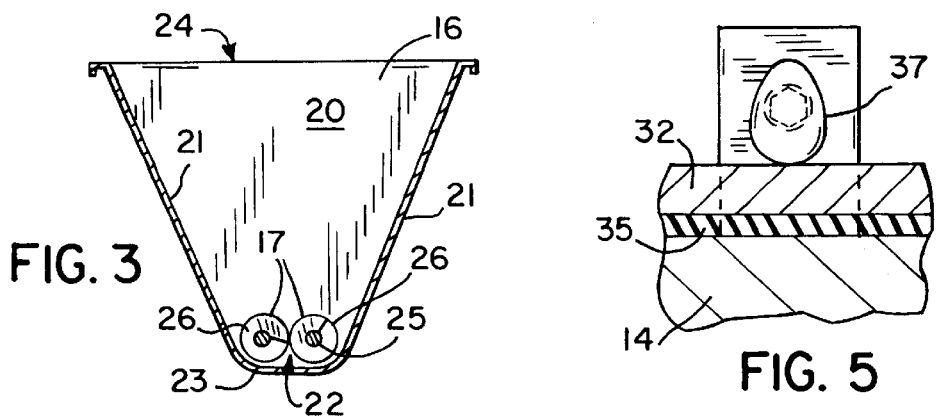
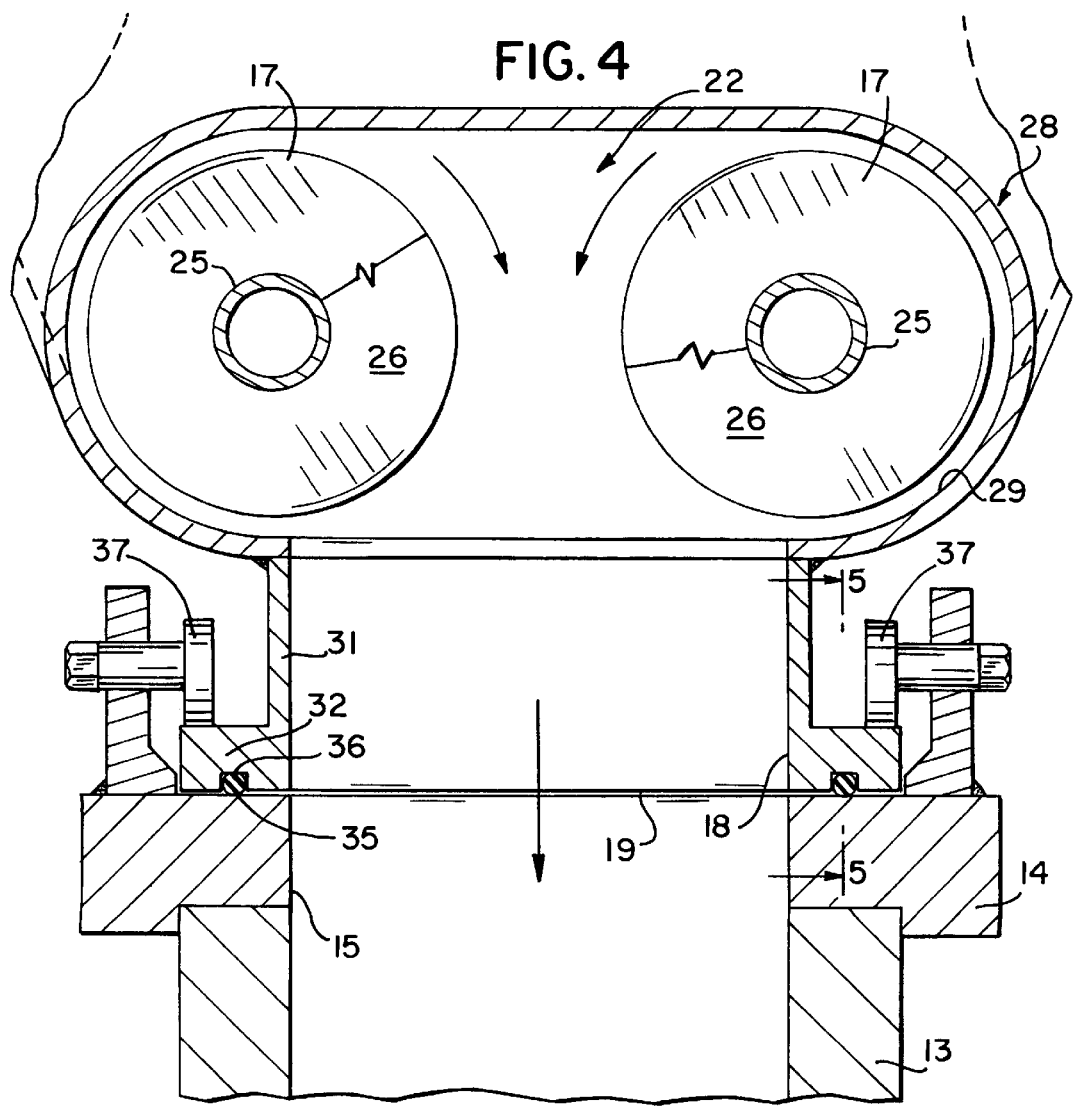

SCREW FEEDER FOR PROPORTIONING MACHINE

BACKGROUND OF THE INVENTION

The subject invention relates to a machine for proportioning bulk products for containerization and, more particularly, to a fill hopper utilizing a screw feeder or supplying bulk food products to the inlet of a proportioning machine.

Vacuum proportioning machines for filling, packaging, or stuffing bulk food products into containers for casings are well known in the industry. Such machines may be used to process a wide range of processed foods, such as processed cheese, grated cheese, ground meat, and the like. Proportioning machines typically have an upper vertically oriented inlet to feed the material to be packaged into a device which meters the product into precise proportions for packaging. In one type of proportioning device, the metering apparatus is a rotary vane pump. Uniform feeding of product through the system is enhanced by applying a vacuum to the flow.

The bulk food product is typically fed to the machine inlet from a feed hopper mounted above the machine and utilizing gravity flow, assisted by the applied vacuum, to provide a continuous supply of food product to the proportioning machine. It has been found, however, that certain types of food products, such as heavy viscous process cheese or loose open material such as grated cheese do not feed well. Such products may be susceptible to bridging at the bottom of the hopper near the machine inlet, resulting in an interruption in uniform flow. Attempts have been made to remedy these problems by providing the feed hopper with a vertically oriented auger or feed screw which is operated to keep the bulk food product moving downwardly to the bottom of the hopper and toward the proportioning machine inlet. However, such vertical auger devices have not successfully overcome the problems and, furthermore, the orientation of a vertical auger directly over and extending into the feed hopper does not comply with food processing standards and regulations.

In addition, many bulk food products must not be subjected to any significant agitation in order to prevent degradation of the quality and/or the appearance. For example, prepared macaroni and cheese products must be handled gently when packaged with a proportioning machine.

SUMMARY OF THE INVENTION

In accordance with the present invention, a proportioning machine feed apparatus utilizes a feed hopper with a unique dual screw feed system which overcomes all of the problems in prior art feed devices. The apparatus includes a feed hopper which is positioned above the machine and has a rather large upper supply opening and which tapers downwardly to a trough-shaped bottom. A product feed outlet is located at one end of the bottom of the hopper and is positionable to lie adjacent to the proportioning machine inlet. A pair of horizontally spaced feed screws are mounted for counterrotation in the trough-shaped bottom of the hopper, with the downstream ends of the feed screws positioned to direct product into the feed outlet.

Preferably, the feed screws have parallel rotational axes. The screws are provided with respective right and left hand flights and are oriented to provide a product movement downwardly at the downstream ends of the screws. The feed apparatus is particularly adapted for use with a proportioning machine having a product inlet positioned to receive a vertical downward product flow, and the apparatus includes a feed extension on the hopper bottom which is positioned to receive the downstream ends of the feed screws and includes an outlet sleeve which extends downwardly from the feed extension and defines the feed outlet to the inlet of the proportioning machine. Preferably, the proportioning machine product inlet is defined by an inlet cover plate, and the outlet sleeve on the hopper extension includes an outlet flange which is adapted to overlie the inlet cover plate and provide operative alignment between the hopper feed outlet and the machine inlet. An O-ring seal is provided between the outlet flange and the inlet cover plate, and means are provided for holding the flange and the plate in sealing engagement.

The hopper is preferably pivotally mounted on the machine such that the hopper may be rotated between an inoperative position with the feed screws oriented generally vertically and an operative feed position with the feed outlet over the proportioning machine inlet.

BRIEF DESCRIPTION OF THE DRAWINGS

FIG. 3 is a vertical section taken on line 3—3 of FIG. 1.

FIG. 4 is an enlarged partial sectional view taken on line 4—4 of FIG. 1.

FIG. 5 is a vertical sectional detail taken on line 5—5 of FIG. 4.

DETAILED DESCRIPTION OF THE PREFERRED EMBODIMENT

Figure 1:
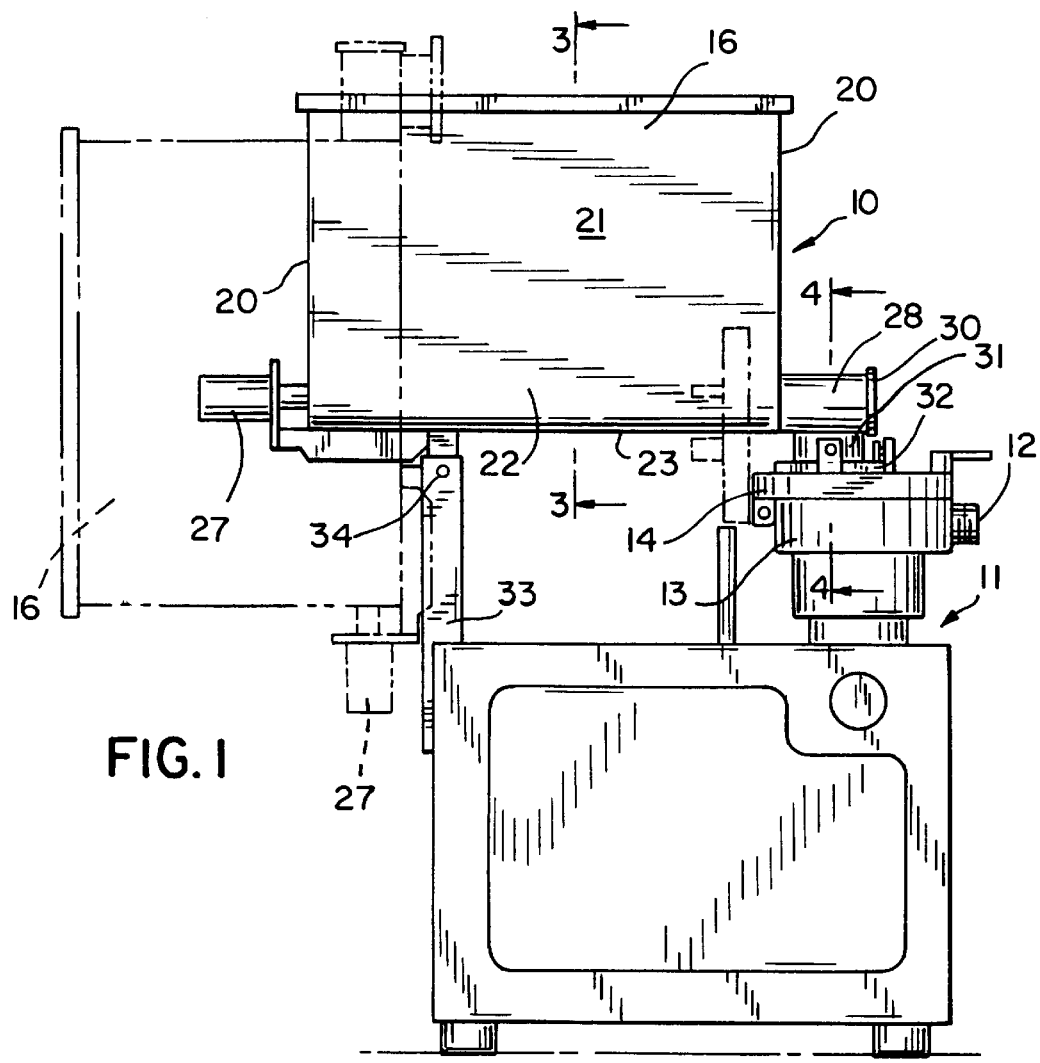
FIG. 1 is a side elevation of a proportioning machine having attached thereto a feed apparatus of the present invention.
Figure 2:
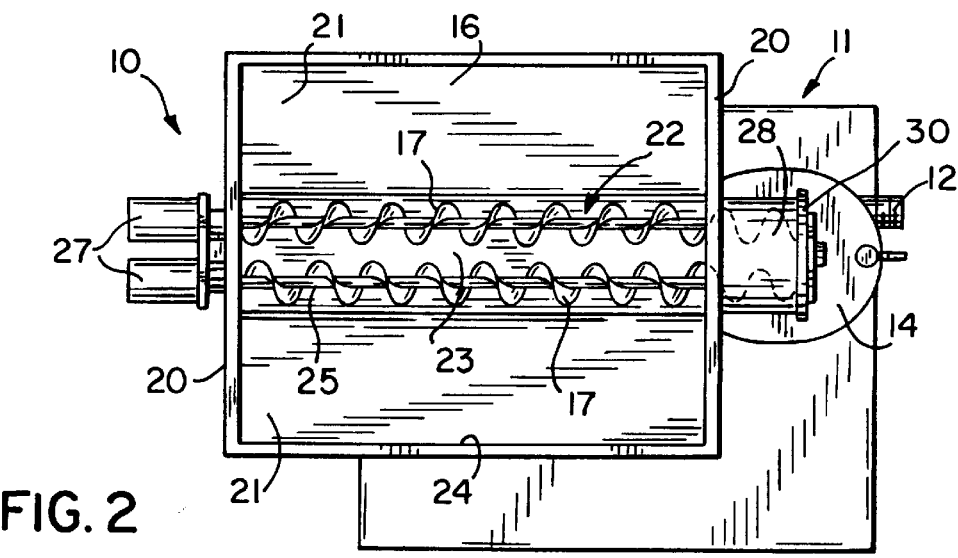
FIG. 2 is a top plan view of the feed apparatus and machine of FIG. 1.

Referring initially to FIGS. 1 and 2, the feed apparatus 10 of the present invention is shown mounted on top of a conventional proportioning machine 11. Proportioning machines are typically utilized to package bulk food products by feeding accurately proportioned volumes from a fill outlet 12 into some sort of food container which may comprise, for example, continuously formed plastic bags for cheese products or continuously linked casings for sausages. Many other types of bulk food products can be similarly processed and packaged, all in a manner well known in the art.

Metered amounts of food product may be fed to the machine fill outlet 12 from a metering pump in a pump chamber 13. The pump chamber is enclosed by an upper cover plate 14 which has a large fill inlet 15 to which bulk food product is fed by the feed apparatus 10 of the present invention. The continuous flow of food product into and through the proportioning machine 11 is typically vacuum-assisted.

The basic components of the feed apparatus 10 of the present invention include a feed hopper 16, a pair of feed screws 17 positioned in the bottom of the hopper, and a hopper outlet 18 defining a feed outlet opening 19 adapted to be aligned with and to feed product to the machine fill inlet 15. Referring also to FIG. 3, the hopper 16 has a pair of parallel end walls 20 interconnected by downwardly convergent side walls 21 to form a trough-like bottom 22 which is closed by a flat horizontal bottom wall 23. The top of the hopper 16 is typically completely open to define a large supply opening 24, but which may be enclosed by a removable cover (not shown).

The feed screws 17 are rotatably mounted in parallel spaced relation in the trough at the bottom of the hopper.

Each feed screw 17 includes a screw shaft 25 to which a continuous spiral flight 26 is attached. The upstream ends of the screw shafts 25 extend through one end wall 20 and are rotatably journaled therein on sealed bearings. Each screw shaft is connected to a drive motor 27 mounted on the outside of the end wall 20. Preferably, hydraulic motors are used, but any conventional rotary driving device may be utilized. The feed screws 17 extend the full length of the hopper, through a hopper outlet opening 29 in the downstream end wall 20, and into a substantially enclosed feed extension 28 where the opposite ends of the screw shafts 25 are rotatably journaled in a closure plate 30. The bottom of the extension 28 is open and has attached to it an outlet sleeve 31 which extends downwardly to an outlet flange 32 which defines the outlet from the feed apparatus 10. The opening in the outlet flange 32 is directly aligned with the fill inlet 15 in the cover plate 14 of the proportioning machine.

The feed screws 17 are driven in a counterrotating manner and the flights 26 are provided with opposite hand spirals. As a result, the bulk food product in the hopper 16 is moved in the downstream direction and simultaneously drawn downwardly into the space between the feed screws 17 (as best seen in FIG. 4). The feed screws carry the food product into the feed extension 28 and the downward movement provided by counterrotation assists in directing the food product downwardly through the outlet sleeve 31 and into the fill inlet 15 of the proportioning machine. This uniform combination of axial and downward movements has been found to eliminate undesirable bridging of food product at the bottom of the hopper and interruption in the continuous flow.

The feed apparatus 10 is supported on the proportioning machine 11 at the downstream end by the outlet flange 32 resting on the machine cover plate 14 and at the upstream end by a vertical support bracket 33 extending between the top of the machine and the underside of the hopper 16. The upper connection between the support bracket 33 and the hopper is provided by a horizontal pivot shaft 34 which allows the hopper to be tilted upwardly and positioned with the feed screws 17 oriented generally vertically (as shown in the phantom line position in FIG. 1) for cleaning and maintenance, and to provide access to the proportioning machine as well.

Because the proportioning machine is typically operated under a vacuum, the interface between the outlet flange 32 and the machine cover plate 14 must be sealed in the operative position (as shown in FIG. 4 and in the full line position of FIG. 1). An O-ring seal 35 is positioned in a groove 36 in the bottom face of the outlet flange 32, the O-ring surrounding the fill inlet 15 in the cover plate and sealing the interface. Referring also to FIG. 5, a pair of locking cams 37 provide and hold sealing engagement between the outlet flange 32 and the cover plate 14.

We claim:

1. A feed apparatus for supplying product to a bulk product proportioning machine having a fill inlet, said apparatus comprising:

a feed hopper positioned above the machine, said hopper having an upper supply opening, a trough-shaped bottom, and a feed outlet extending from a hopper outlet opening at one end of the hopper bottom operatively positionable adjacent the machine inlet, said feed outlet including an outwardly extending feed screw extension and an outlet sleeve extending downwardly from the feed screw extension and defining a feed outlet opening; and, a pair of horizontally spaced feed screws mounted for counterrotation in the trough-shaped bottom and having downstream ends positioned in the feed screw extension to direct product into said feed outlet, said feed screw extension and outlet sleeve defining a closed path between the hopper outlet opening and the feed outlet opening.

2. The apparatus as set forth in claim 1 wherein said feed screws have parallel rotational axes.

3. The apparatus as set forth in claim 1 wherein said feed screws are provided with respective right and left hand flights and the screws are oriented to provide a product movement downwardly at the downstream ends of the screws.

4. The apparatus as set forth in claim 1 wherein the outlet sleeve on said feed extension includes an outlet flange defining said feed outlet opening adapted to provide operative alignment between the feed outlet and the machine inlet.

5. The apparatus as set forth in claim 4 including an O-ring seal recessed in said outlet flange; and, means for holding said flange in operative sealing engagement with the machine inlet.

* * * * *

UNITED STATES PATENT AND TRADEMARK OFFICE
CERTIFICATE OF CORRECTION

PATENT NO. : 6,050,456
DATED : April 18, 2000
INVENTOR(S) : James L. Soper

It is certified that error appears in the above-identified patent and that said Letters Patent is hereby corrected as shown below:

ON THE TITLE PAGE
Item [75] Inventors: Delete "Dan R. Free"

Signed and Sealed this

Twenty-ninth Day of May, 2001

*Attest:*

NICHOLAS P. GODICI

*Attesting Officer*   Acting Director of the United States Patent and Trademark Office